US012674981B2

(12) United States Patent
Inada

(10) Patent No.: US 12,674,981 B2
(45) Date of Patent: Jul. 7, 2026

(54) IMAGE DISPLAY CONTROLLER AND IMAGE DISPLAY CONTROLLING METHOD FOR CONTROLLING IMAGE DISPLAY ON WEARABLE TERMINAL, AND IMAGE DISPLAYING SYSTEM

(71) Applicant: TOYOTA JIDOSHA KABUSHIKI KAISHA, Aichi-ken (JP)

(72) Inventor: Tomohiro Inada, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 899 days.

(21) Appl. No.: 17/991,140

(22) Filed: Nov. 21, 2022

(65) Prior Publication Data

US 2023/0161161 A1     May 25, 2023

(30) Foreign Application Priority Data

Nov. 22, 2021     (JP) ................................. 2021-189146

(51) Int. Cl.
*G02B 27/01*          (2006.01)
(52) U.S. Cl.
CPC ..... *G02B 27/0172* (2013.01); *G02B 27/0179* (2013.01); *G02B 2027/0138* (2013.01); *G02B 2027/014* (2013.01)
(58) Field of Classification Search
CPC ............ G02B 27/0172; G02B 27/0179; G02B 2027/0138; G02B 2027/014
See application file for complete search history.

(56) References Cited

U.S. PATENT DOCUMENTS

| | | | |
|---|---|---|---|
| 10,775,634 B2 * | 9/2020 | Tümler | ............... G02B 27/0179 |
| 11,687,305 B2 * | 6/2023 | Kuehne | ................ G02B 27/017 |
| | | | 345/672 |
| 2018/0208208 A1 * | 7/2018 | Chen | ...................... B60R 16/037 |
| 2021/0118192 A1 | 4/2021 | Sato et al. | |
| 2021/0168563 A1 * | 6/2021 | Sanji | ........................ E05B 49/00 |

FOREIGN PATENT DOCUMENTS

| | | |
|---|---|---|
| JP | 2017129406 A | 7/2017 |
| JP | 2018129094 A | 8/2018 |
| JP | 202164906 A | 4/2021 |

* cited by examiner

*Primary Examiner* — Antonio A Caschera
(74) *Attorney, Agent, or Firm* — HAUPTMAN HAM, LLP

(57)          ABSTRACT

An image display controller for displaying an image on a display of a wearable terminal is configured to estimate a self-location of the wearable terminal, determine a display position of an image on the display based on the estimated self-location, display the image at the determined display position, detect whether an actual location of the wearable terminal is in a vehicle compartment, and decrease a frequency of estimating the self-location when the actual location is detected in the vehicle compartment to a frequency lower than a frequency of estimating the self-location when the actual location is detected outside the vehicle compartment.

18 Claims, 9 Drawing Sheets

IMAGE DISPLAY CONTROLLER AND IMAGE DISPLAY CONTROLLING METHOD FOR CONTROLLING IMAGE DISPLAY ON WEARABLE TERMINAL, AND IMAGE DISPLAYING SYSTEM

CROSS REFERENCE TO RELATED APPLICATION

This application claims priority to Japanese Patent Application No. 2021-189146 filed on Nov. 22, 2021, which is incorporated herein by reference in its entirety including the specification, claims, drawings, and abstract.

TECHNICAL FIELD

The present disclosure relates to a configuration of an image display controller and an image display controlling method for operating a wearable terminal incorporating a display arranged in a field of view of a wearer, to display an image using augmented reality technology (hereinafter, referred to as AR technology), and to an image displaying system including the wearable terminal and the image display controller.

BACKGROUND

There have been suggested apparatuses which display on a display of smart glasses, using AR technology, driving operation information indicating driving operations which should be performed on a vehicle to arrive at a destination. Such apparatuses employ a method for detecting, from an image captured by a camera, an object that can be used as a marker of a predetermined display position and displaying an image at the display position (see, for example, JP 2017-129406 A).

Meanwhile, an image displaying system has been suggested in which the AR technology is used for giving a wearer the impression that appearances of interior parts of a vehicle are changed (see, for example, JP 2021-64906 A).

In the above-described apparatuses, when image displaying operation is performed within a vehicle compartment by means of the AR technology, a display position of an image is determined by employing a method for detecting a marker, for example, from colors or shapes of interior parts present in the vehicle compartment. However, in a case where an appropriate level of brightness of the image is not obtained due to a backlighted situation or during the nighttime, for example, the apparatus may, in some cases, misidentify the marker and accordingly display the image at a position which is not intended by a user.

Given these circumstances, the present disclosure is directed to reducing the occurrence of misalignment of an image when the image is displayed within a vehicle compartment using AR technology.

SUMMARY

An image display controller according to this disclosure is an apparatus for displaying an image on a display of a wearable terminal. The image display controller is configured to estimate a self-location of the wearable terminal, determine a display position of an image on the display based the estimated self-location, display the image at the determined display position, detect whether an actual location of the wearable terminal is in a vehicle compartment, and when the actual location is detected in the vehicle compartment, decrease a frequency of estimating the self-location to a frequency lower than a frequency of estimating the self-location when the actual location is detected outside the vehicle compartment.

In this way, the occurrence of misalignment of the image on the display can be reduced in a state where the wearable terminal is used within the vehicle compartment.

In the image display controller according to this disclosure, when the actual location is in the vehicle compartment, subsequent estimation of the self-location and a change of the display position may be suspended during a predetermined time period after the self-location is estimated.

This can prevent frequent occurrence of misalignment of the image on the display in the state where the wearable terminal is used in the vehicle compartment.

In the image display controller according to this disclosure, the image may be displayed at a fixed position, which has been previously defined on the display, until the self-location is initially estimated when the actual location is in the vehicle compartment, or until subsequent estimation of the self-location is successfully completed after a failure in estimation of the self-location when the actual location is in the vehicle compartment.

In the state where the wearable terminal is used in the vehicle compartment, because the display position of the image is set to the fixed position in a case where initial estimation of the self-location has not yet been performed or estimation of the self-location has failed, confusion of a wearer of the wearable terminal can be prevented.

In the image display controller according to this disclosure, the self-location of the wearable terminal may be estimated based on an image captured by an image pickup device installed in the wearable terminal, and whether the actual location of the wearable terminal is in the vehicle compartment may be detected through communication with the vehicle.

With the above-described configuration, both estimation of the self-location of the wearable terminal and detection of the actual location of the wearable terminal can be performed in a simple way.

In the image display controller according to this disclosure, it may be further detected through communication with the vehicle whether the vehicle is traveling or a wearer of the wearable terminal is driving, and when it is detected that the vehicle is traveling or the wearer is driving in addition to the actual location being detected in the vehicle compartment, the frequency of estimating the self-location may be decreased to a frequency lower than a frequency of estimating the self-location when it is solely detected that the actual location is in the vehicle compartment.

With the above-described configuration, in the state where the wearable terminal is used in the vehicle compartment, the occurrence of misalignment of the image on the display can be further reduced when the vehicle is traveling, or when the wearer is driving the vehicle.

In the image display controller according to this disclosure, the frequency of estimating the self-location may be decreased only in a case where the image pickup device captures the image during the nighttime or against the sun.

In this way, misalignment of the image on the display can be prevented when the self-location is estimated at a low accuracy.

An image display controlling method according to an aspect of this disclosure is a method for displaying an image on a display of a wearable terminal, the method including estimating a self-location of the wearable terminal, determining a display position of an image on the display based on the estimated self-location, displaying the image at the determined display position, detecting whether an actual location of the wearable terminal is in a vehicle compartment, and when the actual location is detected in the vehicle compartment, decreasing a frequency of estimating the self-location to a frequency lower than a frequency of estimating the self-location when the actual location is detected outside the vehicle compartment.

In the image display controlling method according to this disclosure, when the actual location is in the vehicle compartment, subsequent estimation of the self-location and a change of the display position may be suspended during a predetermined time period after the self-location is estimated.

In the image display controlling method according to this disclosure, when the actual location is in the vehicle compartment, the image may be displayed at a fixed position, which has been previously defined on the display, until the self-location is initially estimated, or until subsequent estimation of the self-location is successfully completed after a failure in estimation of the self-location.

In the image display controlling method according to this disclosure, the self-location of the wearable terminal may be estimated based on an image captured by an image pickup device installed in the wearable terminal, and communication with a vehicle can be used to detect whether the actual location of the wearable terminal is in the vehicle compartment.

In the image display controlling method according to this disclosure, communication with the vehicle can be used to further detect whether the vehicle is traveling or a wearer of the wearable terminal is driving, and when it is further detected that the vehicle is traveling or the wearer is driving in addition to the actual location being detected in the vehicle compartment, the frequency of estimating the self-location may be decreased to a frequency lower than a frequency of estimating the self-location when it is solely detected that the actual location is in the vehicle compartment.

In the image display controlling method according to this disclosure, the frequency of estimating the self-location may be decreased only in a case where the image pickup device captures the image during the nighttime or against the sun.

An image displaying system according to an aspect of this disclosure includes a wearable terminal, which incorporates an image pickup device and a display, and a controller configured to estimate a self-location of the wearable terminal based on an image captured by the image pickup device of the wearable terminal, determine a display position of the image on the display based on the estimated self-location, and display the image at the determined display position, in which the controller is further configured to detect, through communication with a vehicle, whether an actual location of the wearable terminal is in the vehicle compartment, and when the actual location is detected in the vehicle compartment, decrease a frequency of estimating the self-location to a frequency lower than a frequency of estimating the self-location when the actual location is detected outside the vehicle compartment.

In the image displaying system according to this disclosure, the controller may be further configured to suspend subsequent estimation of the self-location and a change of the display position during a predetermined time period after the self-location is estimated when the actual location is in the vehicle compartment.

According to this disclosure, the occurrence of misalignment of the image can be reduced in a case where the image is displayed within the vehicle compartment using AR technology.

BRIEF DESCRIPTION OF DRAWINGS

Embodiments of the present disclosure will be described based on the following figures, wherein.

DESCRIPTION OF EMBODIMENTS

Figure 1:
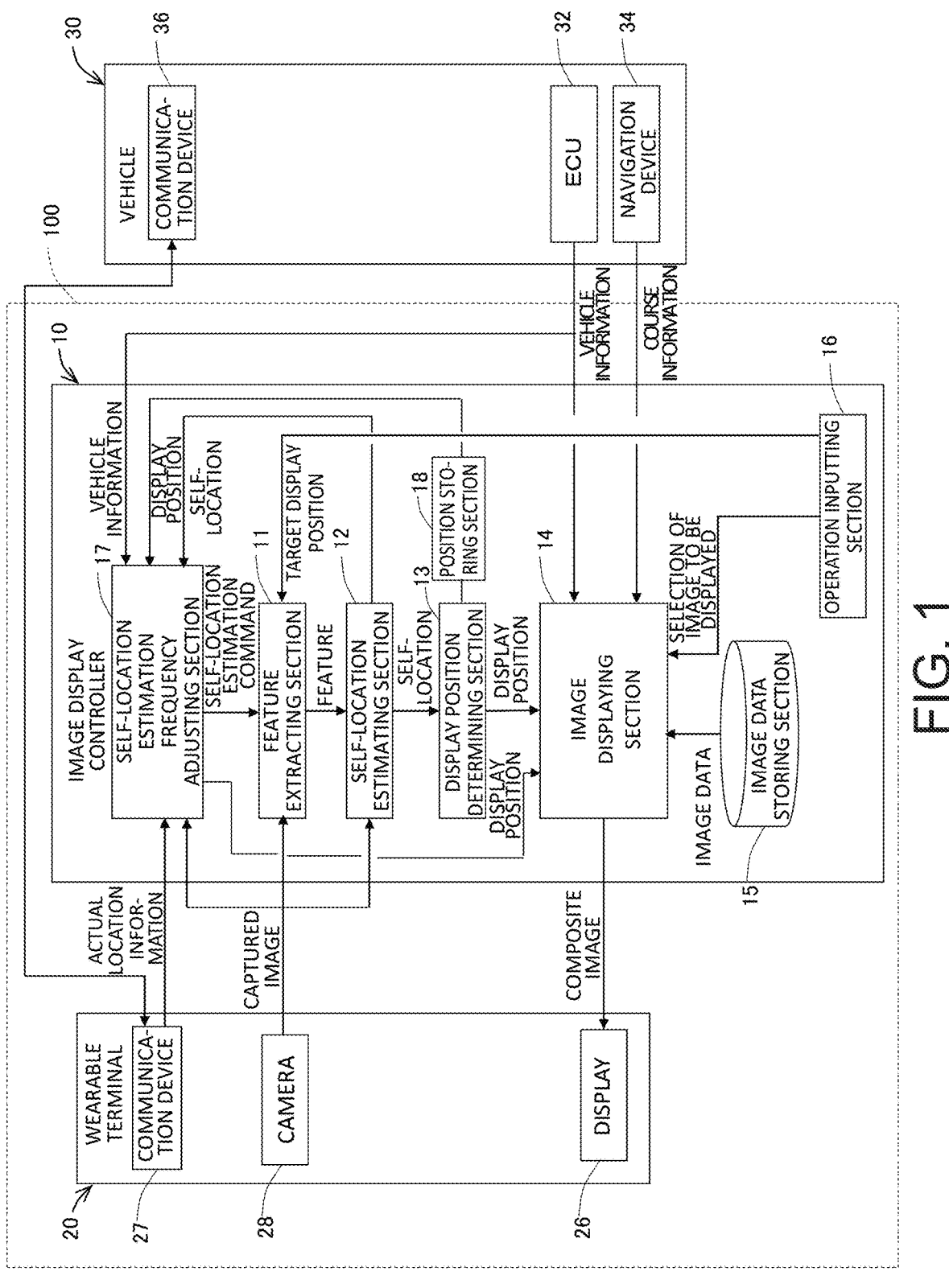
FIG. 1 is a functional block diagram showing a configuration of an image display controller according to an embodiment.

Hereinafter, an image display controller 10 according to an embodiment is explained with reference to the drawings. As shown in FIG. 1, the image display controller 10 estimates, based on a captured image taken by a camera 28 which is an image pickup device installed in a wearable terminal 20, a self-location of the wearable terminal 20 and displays an image on a display 26 of the wearable terminal 20. The image display controller 10 and the wearable terminal 20 constitute an image displaying system 100.

The wearable terminal 20 is a device which is worn by a driver 200 or a passenger of a vehicle in a like manner with eyeglasses or goggles. The wearable terminal 20 is equipped with the camera 28 being the image pickup device, the display 26, and a communication device 27.

Figure 2:
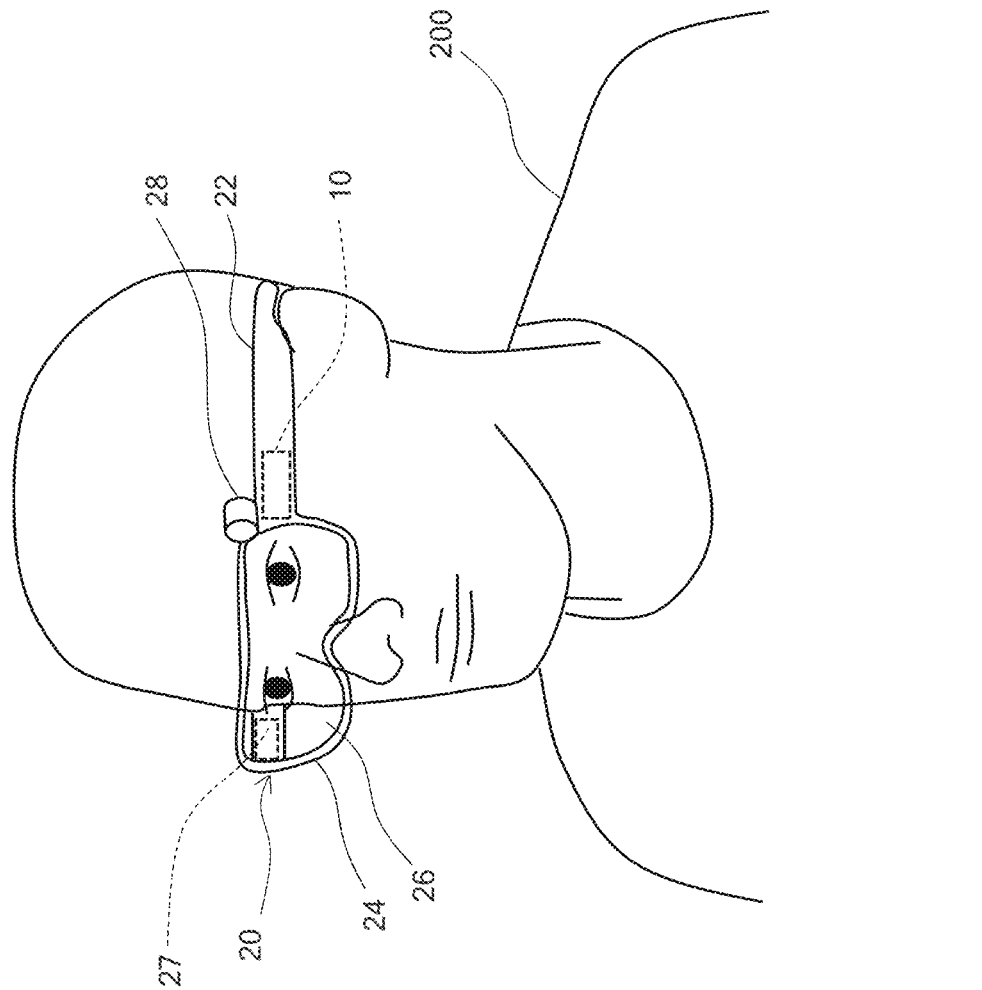
FIG. 2 is a perspective view showing a driver wearing a wearable terminal.

Referring now to FIG. 2, the wearable terminal 20 is explained. FIG. 2 shows a state of the driver 200 wearing the wearable terminal 20. The wearable terminal 20 is formed in a shape of a pair of glasses and may be in some cases referred to as smart glasses. The wearable terminal 20 includes temples 22, and a rim 24 connected to the temples 22, in which each of the temples 22 constitutes a linear part of a frame that is designed to be put on an ear, and the rim 24 constitutes a part of the frame that is designed to surround the eyes of the wearer 20 and to be put on the nose of the wearer 20.

The display 26 which is a display apparatus is fitted in the rim 24. The display 26, which is placed within a visual field of the driver 200 so as to block a forward view in front of the eyes of the driver 200, is designed to become highly transparent (exhibit a high degree of light transparency) when no image is formed on the display 26, for allowing the driver 200 to view forward through the display 26 displaying no image. The display 26 can form an image on its partial region or the entire region under control of the image display controller 10.

The camera 28 is installed in the vicinity of a joint between the rim 24 and a left temple 22 on a left eye side of the driver 200. The camera 28 captures an image of the interior of a vehicle compartment when the driver 200 wearing the wearable terminal 20 enters the vehicle compartment, and outputs the captured image. The temple 22 on a right eye side of the driver 200 incorporates the communication device 27 configured to communicate with a vehicle 30. The communication device 27 outputs, when communication with a communication device 36 mounted on the vehicle 30 is established, actual location information indicating that the wearable terminal 20 is actually located in the vehicle compartment of the vehicle 30 (i.e., an actual location of the wearable terminal 20 is in the vehicle compartment). Further, the temple 22 on the left eye side incorporates the image display controller 10, which is explained below.

Referring back to FIG. 1, the image display controller 10 is described. As shown in FIG. 1, the image display controller 10 is composed of functional blocks including a feature extracting section 11, a self-location estimating section 12, a display position determining section 13, an image displaying section 14, an image data storing section 15, an operation inputting section 16, a self-location estimation frequency adjusting section 17, and a position storing section 18. The image display controller 10 is connected to the wearable terminal 20 through a wired or wireless channel. Further, the image display controller 10 is connected to the vehicle 30 through a wireless channel to receive vehicle information and course information from an ECU 32 and a navigation apparatus 34 of the vehicle 30, respectively.

The feature extracting section 11 receives from the camera 28 of the wearable terminal 20 an image captured by the camera 28. The feature extracting section 11 processes the received image to extract one or more features of the interior of the vehicle compartment. The feature, which is also referred to as a marker, is a part of the vehicle compartment that can function as an indicator of a particular position within the vehicle compartment.

The self-location estimating section 12 estimates, based on both the image captured by the camera 28 and the feature of the vehicle compartment extracted by the feature extracting section 11, a relative location of the wearable terminal 20 that is defined with respect to the feature, and outputs the estimated relative location as the self-location of the wearable terminal 20.

Based on both the self-location estimated by the self-location estimating section 12 and the feature extracted by the feature extracting section 11, the display position determining section 13 calculates which position on the display 26 is intersected by a line connecting a pupil of the driver 200 and the feature. Then, the display position determining section 13 calculates a position on the display 26 at which the image is to be overlaid and displayed on the display 26, and outputs the calculated position as a display position. Further, the display position determining section 13 sends the display position to the position storing section 18.

The operation inputting section 16 is an operation part used by the driver 200 for operating the image display controller 10. The driver 200 can operate the operation inputting section 16 to input an instruction as to whether or not to display an image on the wearable terminal 20 and, in a case of displaying the image, as to which image is displayed at which position.

The image data storing section 15 stores data of images of, for example, right and left arrow symbols for indicating directions of travel, the images being displayed on the display 26 of the wearable terminal 26 by the image display controller 10.

The image displaying section 14 communicates with the vehicle 30, based on operation inputs which are input through the operation inputting section 16 by the driver 200, to receive vehicle information, such as speed information, from the ECU 32 of the vehicle 30 and/or course information including course change information, such as information about a right turn or a left turn, from the navigation apparatus 34, and generates, based on the received vehicle information and/or course information, a content 70 which is an image to be displayed on the display 26 of the wearable terminal 20. Then, the image displaying section 14 causes the display 26 to display, on the display 26, the generated content 70 at the display position, which is input from the display position determining section 13.

The position storing section 18 stores the display position output from the display position determining section 13. Further, the position storing section 18 also stores a fixed position which is previously defined on the display 26.

The self-location estimation frequency adjusting section 17 adjusts a frequency of outputting a self-location estimation command, based on the image that is input from the camera 28, information about an actual location of the wearable terminal 20 that is input from the communication device 27 of the wearable terminal 20, and the vehicle information received from the vehicle 30. Further, the self-location estimation frequency adjusting section 17 reads out from the position storing section 18 a previously determined display position or the fixed position having been previously defined on the display 26, and outputs the read position as the display position to the image displaying section 14. The self-location estimated in the self-location estimating section 12 is input into the self-location estimation frequency adjusting section 17. Still further, the self-location estimation frequency adjusting section 17 determines whether or not the self-location estimating section 12 successfully estimates the self-location, and, when determining that estimation of the self-location has failed, retrieves the fixed position previously defined on the display 26 from the position storing section 18 and outputs the retrieved position as the display position to the image displaying section 14.

Figure 3:
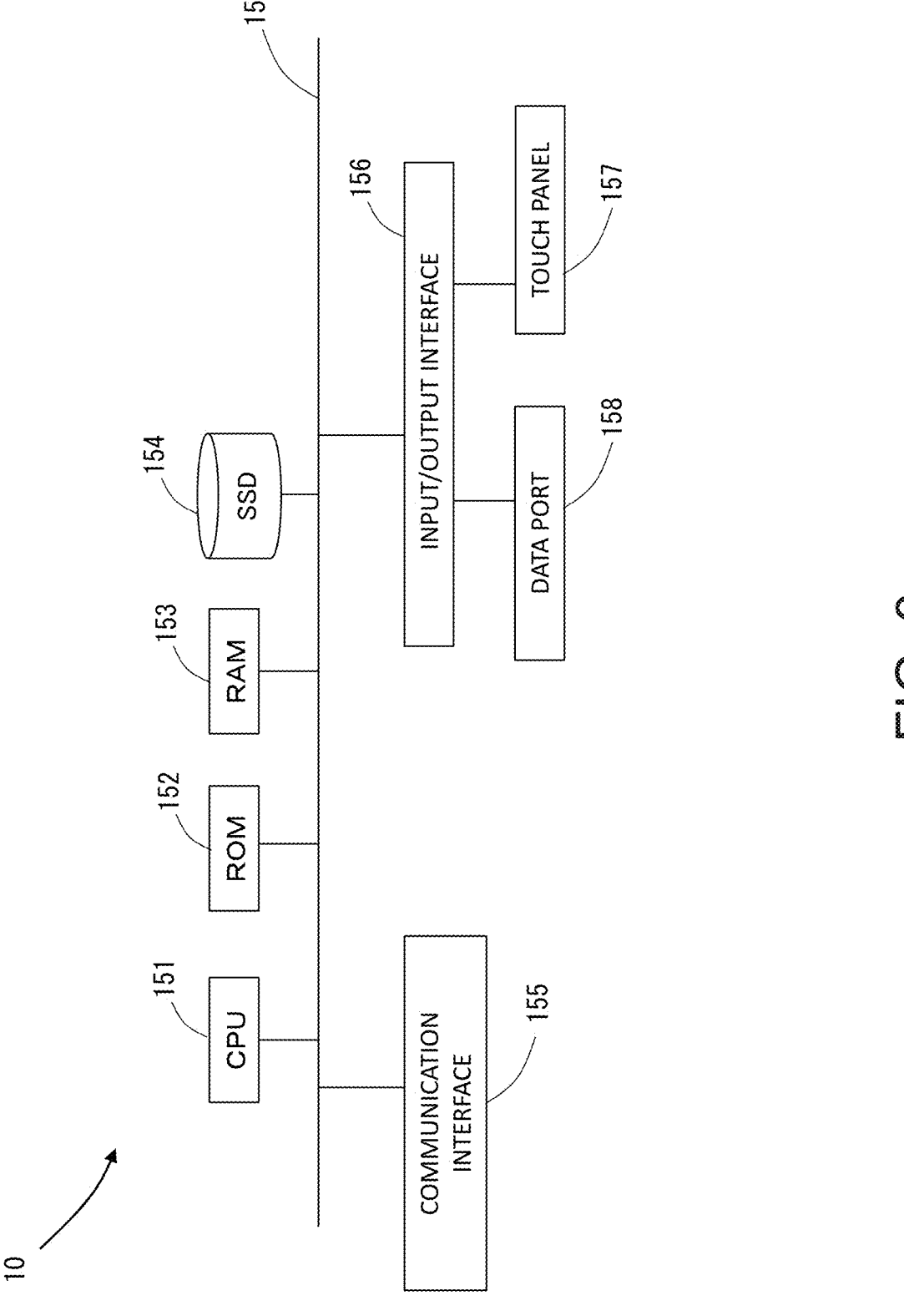
FIG. 3 is a diagram showing a hardware configuration in the image display controller illustrated in FIG. 1.

The above-described image display controller 10 is a computer, and the functional blocks are implemented by hardware as shown in FIG. 3. The image display controller 10 includes, as shown in FIG. 3, a CPU 151 which is a processor configured to perform information processing, a ROM 152, a RAM 153 which temporarily stores data during information processing, an SSD 154 which stores programs, user data, and other data, a touch panel 157 installed as input and display means, and a data port 158 through which data are input and output. The CPU 151, the ROM 152, the RAM 153, and the SSD 154 are connected to each other through a data bus 159. The touch panel 157 and the data port 158 are connected via an input/output controller 156 to the data bus 159. A communication interface 155 installed as communication means is also connected to the data bus 159.

The feature extracting section 11, the self-location estimating section 12, the display position determining section 13, the image displaying section 14, and the self-location estimation frequency adjusting section 17 are implemented by the CPU 151 when the CPU 151 cooperatively operates with the ROM 152 and RAM 153 to execute the programs stored in the SSD 154 shown in FIG. 3. The image data storing section 15 and the position storing section 18 may be implemented by the SSD 154 shown in FIG. 3 when predetermined image data and display position information are stored in the SSD 154. The operation inputting section 16 is implemented by the touch panel 157. In addition, communication with the vehicle 30 is established by the communication interface 155.

Next, basic operations of the image display controller 10 according to an embodiment are explained with reference to FIGS. 4 and 5. The basic operations explained herein constitute an operation to display an image on the display 26 of the wearable terminal 20 using AR technology. In the following description, it is assumed that the driver 200 inputs through the operation inputting section 16 an instruction for displaying a content 70 including a course change indication 71, a remaining battery power indication 72, and a vehicle speed indication 73, as shown in FIG. 5, on a lower right region of a front glass 40, the lower right region being selected as a target display position.

Figure 5:
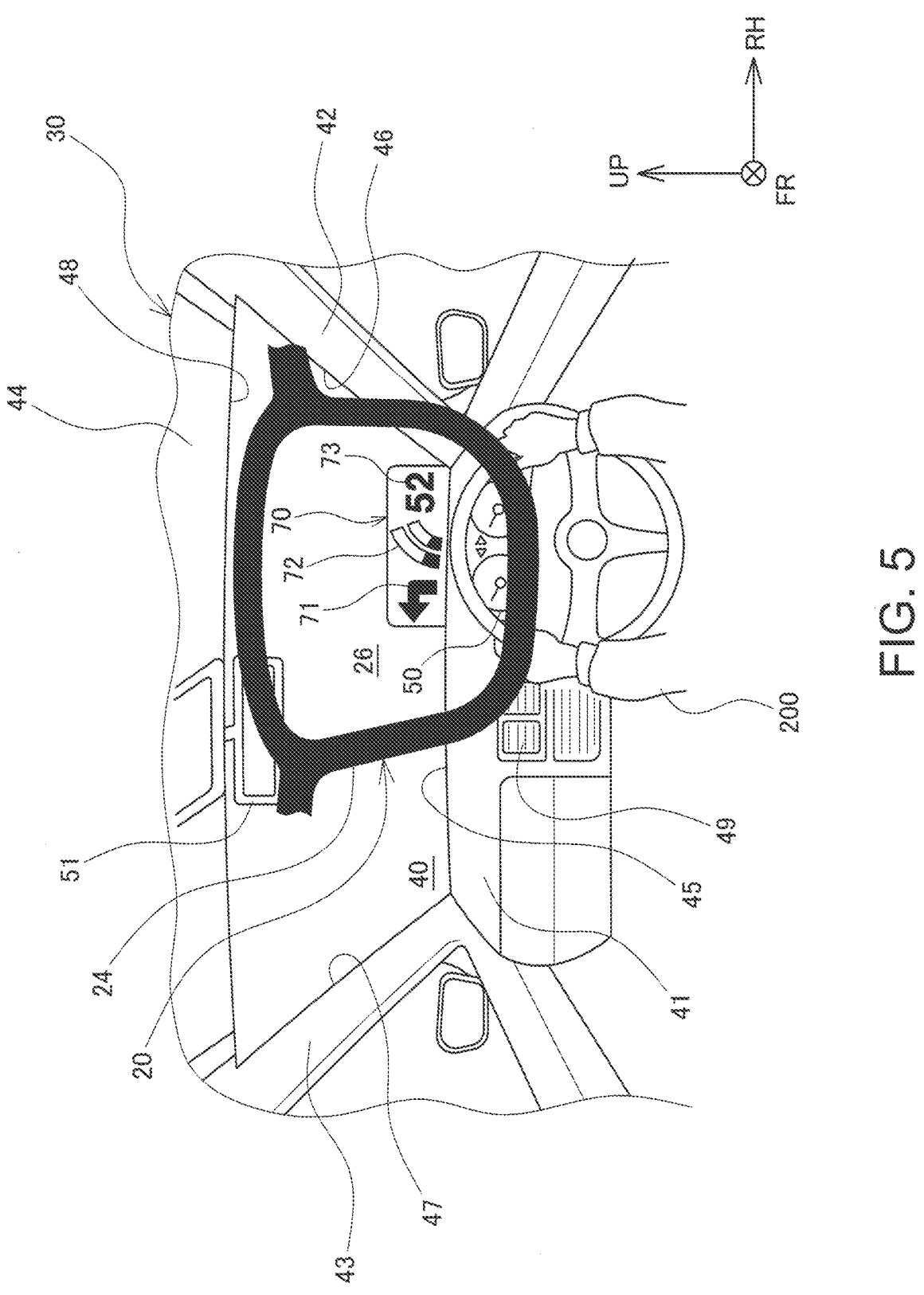
FIG. 5 shows a visual field of the driver wearing the wearable terminal on which an image is displayed by the image display controller illustrated in FIG. 1.

Here, FIG. 5 shows a visual field of the driver 200 wearing the wearable terminal 20 on which an image is displayed by the image display controller 10. As shown in FIG. 5, a dashboard 41 in a front region of a vehicle compartment, a right front pillar 42, a left front pillar 43, a ceiling panel 44, an air outlet port 49, a handle 50, a rearview mirror 51, and other components are present in the visual field of the driver 200. It should be noted that an arrow FR, an arrow UP, and an arrow RH illustrated in FIG. 5 represent a forward direction (traveling direction), an upward direction, and a rightward direction of the vehicle 30, respectively. The same is also applied to those illustrated in FIGS. 6 and 9.

Figure 4:
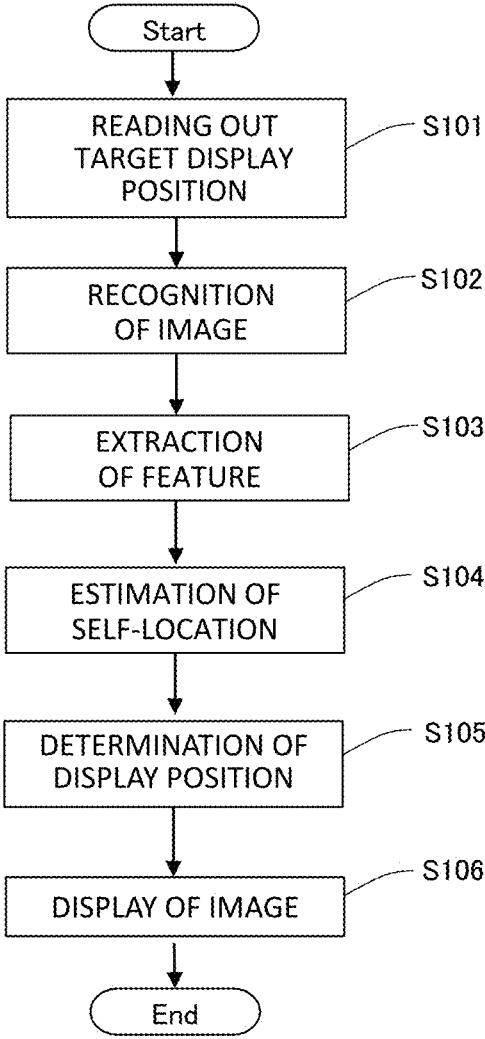
FIG. 4 is a flowchart showing basic operations of the image display controller illustrated in FIG. 1.

The feature extracting section 11 of the image display controller 10 reads out the target display position input in step S101 shown in FIG. 4, obtains an image captured by the camera 28 of the wearable terminal 20, performs image recognition processing on the image in step S102 shown in FIG. 4, and extracts a feature in step S103 of FIG. 4. For example, as shown in FIG. 5, when the lower right region of the front glass 40 is the target display position of the content 70, the feature extracting section 11 extracts as features a demarcation line 45 between the front glass 40 and the dashboard 41 and a demarcation line 46 between the front glass 40 and the right front pillar 42.

In step S104 of FIG. 4 the self-location estimating section 12 estimates, based on an image of the interior of the vehicle compartment captured by the camera 28, a relative location of the wearable terminal 20 defined with respect to the demarcation lines 45 and 46 which are extracted as the features by the feature extracting section 11, and outputs the estimated relative location as a self-location.

The display position determining section 13 calculates, in step S105 of FIG. 4, a plurality of positions on the display 26 of the wearable terminal 20, the positions at which the display 26 is intersected by lines connecting the pupil of the driver 200 and particular points on the demarcation lines 45 and 46, which are extracted as the features in the vehicle compartment. Then, the display position determining section 13 identifies a portion of the display 26 composed of the plurality of positions calculated as being intersected by the lines connecting the pupil and the particular points on the demarcation lines 45 and 46, and outputs the identified portion of the display 26 as a display position on the display 26.

The image displaying section 14 communicates with the vehicle 30 in step S106 of FIG. 4 to receive a vehicle speed and a remaining battery power of the vehicle information from the ECU 32 and also receive the course information from the navigation apparatus 34. Then, the image displaying section 14 generates the content 70 shown in FIG. 5 including the course change indication 71, the remaining battery power indication 72, and the vehicle speed indication 73 with reference to image data stored in the image data storing section 15. Further, the image displaying section 14 displays the generated content 70 at the display position on the display 26 that is input from the display position determining section 13.

When the image is displayed on the display 26 of the wearable terminal 20, the driver 200 views the content 70 including the course change indication 71, the remaining battery power indication 72, and the vehicle speed indication 73, as shown in FIG. 5, in the lower right region of the front glass 40 as if the content 70 were actually displayed in the lower right region of the front glass 40 of the vehicle 30.

The image display controller 10 repeats operations in steps S101 to S106 of FIG. 4 at high speed in order to adjust the display position of the content 70 in real time to a position which is stationary with respect to the demarcation lines 45 and 46 extracted as the features of the vehicle compartment. Accordingly, even when the relative location of the wearable terminal 20 with respect to the demarcation lines 45, 46 of the features of the vehicle compartment is changed due to movement of the face of the driver 200, the content 70 is always viewed by the driver 200 as being displayed stationarily with respect to the demarcation lines 45 and 46 of the features.

Figure 6:
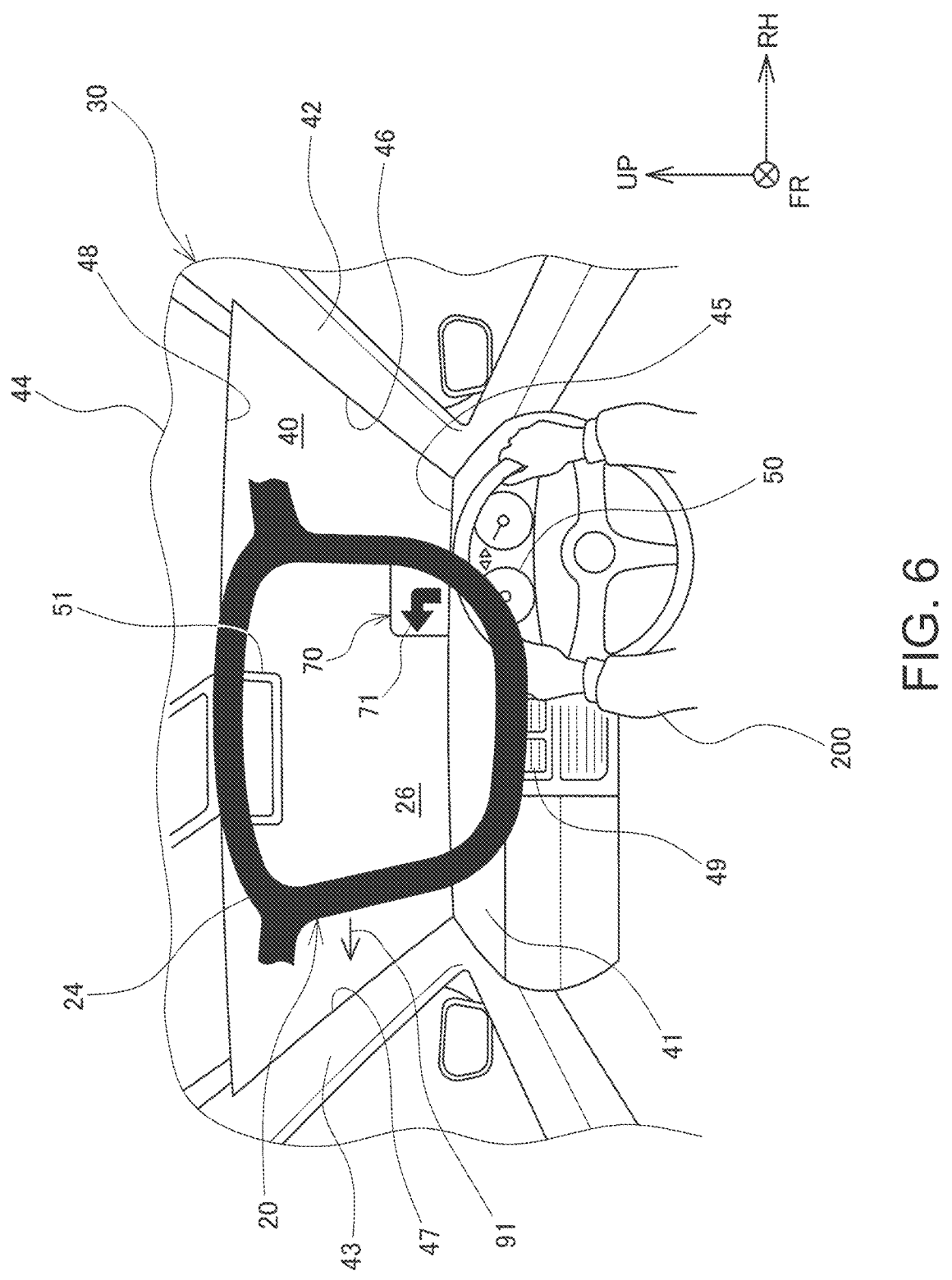
FIG. 6 shows a visual field of the driver wearing the wearable terminal that is obtained when the driver moves his/her face to the left in a state where a self-location of the wearable terminal has been estimated by the image display controller illustrated in FIG. 1.

For example, even when the wearable terminal 20 is shifted leftward as indicated by an arrow 91 in FIG. 6 in response to movement of the face of the driver 200 toward the left, the driver 200 still views the content 70 displayed in the lower right region of the front glass 40 as if the content 70 were always stationarily displayed therein. However, as shown in FIG. 6, on the rightward outside of the rim 24 of the wearable terminal 20 where the display 26 is not present, the driver 200 cannot view a right part of the content 70, and views the front glass 40, the dashboard 41, and the right front pillar 42 of the vehicle 30 on the rightward outside of the rim 24.

Meanwhile, in a case where the camera 28 captures the image in the nighttime or against the sun, due to insufficient luminance, a demarcation line 48 between the front glass 40 and the ceiling panel 44 and a demarcation line 47 between the front glass 40 and the left front pillar 43, for example, may be erroneously extracted as the features in place of the above-described demarcation lines 45 and 46 between the front glass 40 and the dashboard 41 and between the front glass 40 and the right front pillar 42. In this case, the content 70 is suddenly moved from the position in the lower right region of the front glass 40 to a position in an upper left region of the front glass 40, or may be moved depending on situations to a position which cannot be represented on the display 26 of the wearable terminal 20. There may be another case where no features are extracted. In this case, because it is impossible to determine the display position of the content 70, the content 70 cannot be displayed on the display 26.

Given these circumstances, the image display controller 10 according to this embodiment is equipped with the self-location estimation frequency adjusting section 17 for adjusting the frequency of estimating the self-location, in order to prevent the occurrence of misalignment or nondisplay of the content 70 that is unexpected by the driver 200. Hereinafter, an operation of the image display controller 10 according to an embodiment is explained with reference to FIGS. 7 to 9. It should be noted that the same steps as those of the basic operation previously described with reference to FIG. 4 are designated by the same step numbers, and these steps will be only briefly explained.

Figure 7:
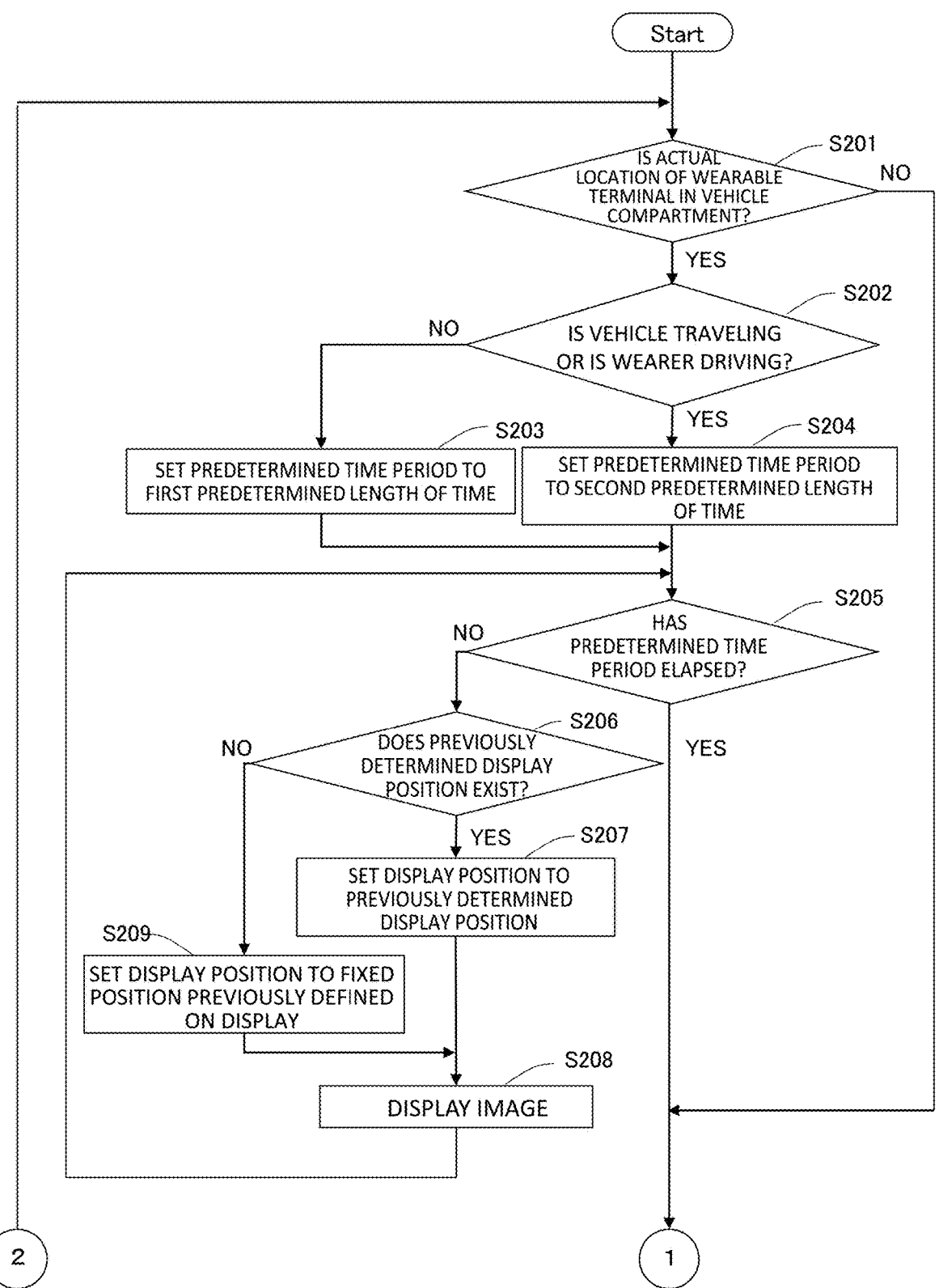
FIG. 7 is a flowchart showing operations of the image display controller illustrated in FIG. 1.

The self-location estimation frequency adjusting section 17 determines in step S201 of FIG. 7 whether the actual location of the wearable terminal 20 is in the vehicle compartment.

The communication device 27 in the wearable terminal 20 outputs, when communication with the communication device 36 in the vehicle 30 is established, actual location information indicating that the actual location of the wearable terminal 20 is in the vehicle compartment. The self-location estimation frequency adjusting section 17 determines YES in step S201 of FIG. 7 when the actual location information is received from the wearable terminal 20, and moves to step S202 of FIG. 7.

In step S202 of FIG. 7, the self-location estimation frequency adjusting section 17 determines whether or not the vehicle 30 is traveling or the wearer of the wearable terminal 20 is driving the vehicle 30.

The determination may be performed using various parameters. For example, the self-location estimation frequency adjusting section 17 may receive information about an ON or OFF status of a starting switch of the vehicle 30 as the vehicle information from the ECU 32 of the vehicle 30 and may determine that the vehicle 30 is traveling when the ON status of the starting switch is received. Alternatively, the self-location estimation frequency adjusting section 17 may receive vehicle speed information as the vehicle information from the ECU 32 of the vehicle 30 and may determine that the vehicle 30 is traveling when the vehicle speed is equal to or greater than a predetermined threshold value, such as, for example, several kilometers per hour. Further alternatively, the self-location estimation frequency adjusting section 17 may perform an image analysis on the image input from the wearable terminal 20 and may determine that the wearer of the wearable terminal 20 is the driver 200 and is presently driving the vehicle 30 when the image represents a front view from a driver seat as illustrated in FIG. 5.

When determining NO in step S202 of FIG. 7, the self-location estimation frequency adjusting section 17 moves to step S203 of FIG. 7 and sets a predetermined time period to a first predetermined length of time. On the other hand, when determining YES in step S202 of FIG. 7, the self-location estimation frequency adjusting section 17 moves to step S204 of FIG. 7 and sets the predetermined time period to a second predetermined length of time which is longer than the first predetermined length of time. Here, a case where NO is determined in step S202 of FIG. 7 corresponds a state in which the driver 200 wearing the wearable terminal 20 has just gotten in the vehicle 30 and has not yet started the vehicle 30.

As described above, the image display controller 10 rapidly repeats the operations in steps S101 to S106 of FIG. 4 in the basic operations to adjust in real time the display position of the content 70 to the position which is stationary with respect to the features of the vehicle compartment. The first and second predetermined lengths of time are longer than a time interval between repetitions of a series of the operations in steps S101 to S106 of FIG. 4 and may be set to 0.5~1 second, 1~3 seconds, or several seconds.

After setting the predetermined time period in step S203 or S204 of FIG. 7, the self-location estimation frequency adjusting section 17 moves to step S205 of FIG. 7 and repeats operations in step S206 to S209 of FIG. 7 without estimating the self-location until the predetermined time period has elapsed.

Figure 8:
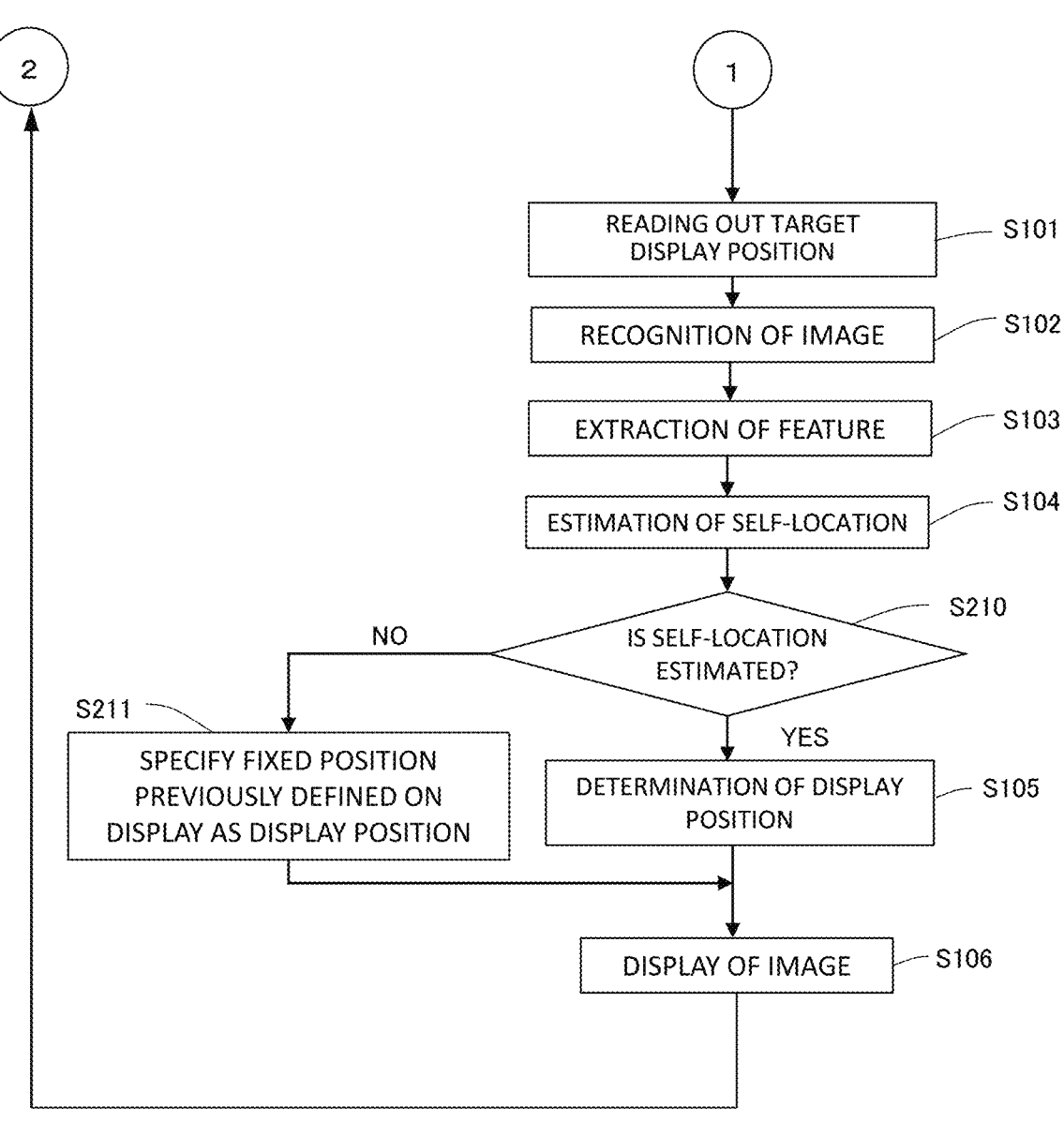
FIG. 8 is a flowchart of operations following those in the flowchart of FIG. 7.

In step S206 of FIG. 7, the self-location estimation frequency adjusting section 17 determines whether or not the display position, which was previously determined in step S206 of FIG. 7, is stored in the position storing section 16. Immediately after the driver 200 wearing the wearing terminal 20 gets in the vehicle 30 and initiates the wearable terminal 20, none of the operations in steps S101 to S106 of FIG. 8 is performed; i.e., no self-location is estimated, and the display position is accordingly undetermined. Therefore, because the position storing section 18 does not store any previously determined display position, the self-location estimation frequency adjusting section 17 determines NO in step S206 of FIG. 7 and moves to step S209 of FIG. 7. Then, in step S209, the self-location estimation frequency adjusting section 17 retrieves the fixed position stored in the position storing section 18, the fixed position being previously defined on the display 26, specifies the retrieved fixed position as the display position, and outputs the specified result to the image displaying section 14. The image displaying section 14 displays in step S208 of FIG. 7 the content 70 on the display position input from the self-location estimation frequency adjusting section 17.

After displaying the content 70 at the previously defined fixed position on the display 26 in step S208 of FIG. 7, the self-location estimation frequency adjusting section 17 returns to step S205 of FIG. 7, and causes the image displaying section 14 to continuously display the content 70 at the previously defined fixed position on the display 26 until the predetermined time period has elapsed.

Figure 9:
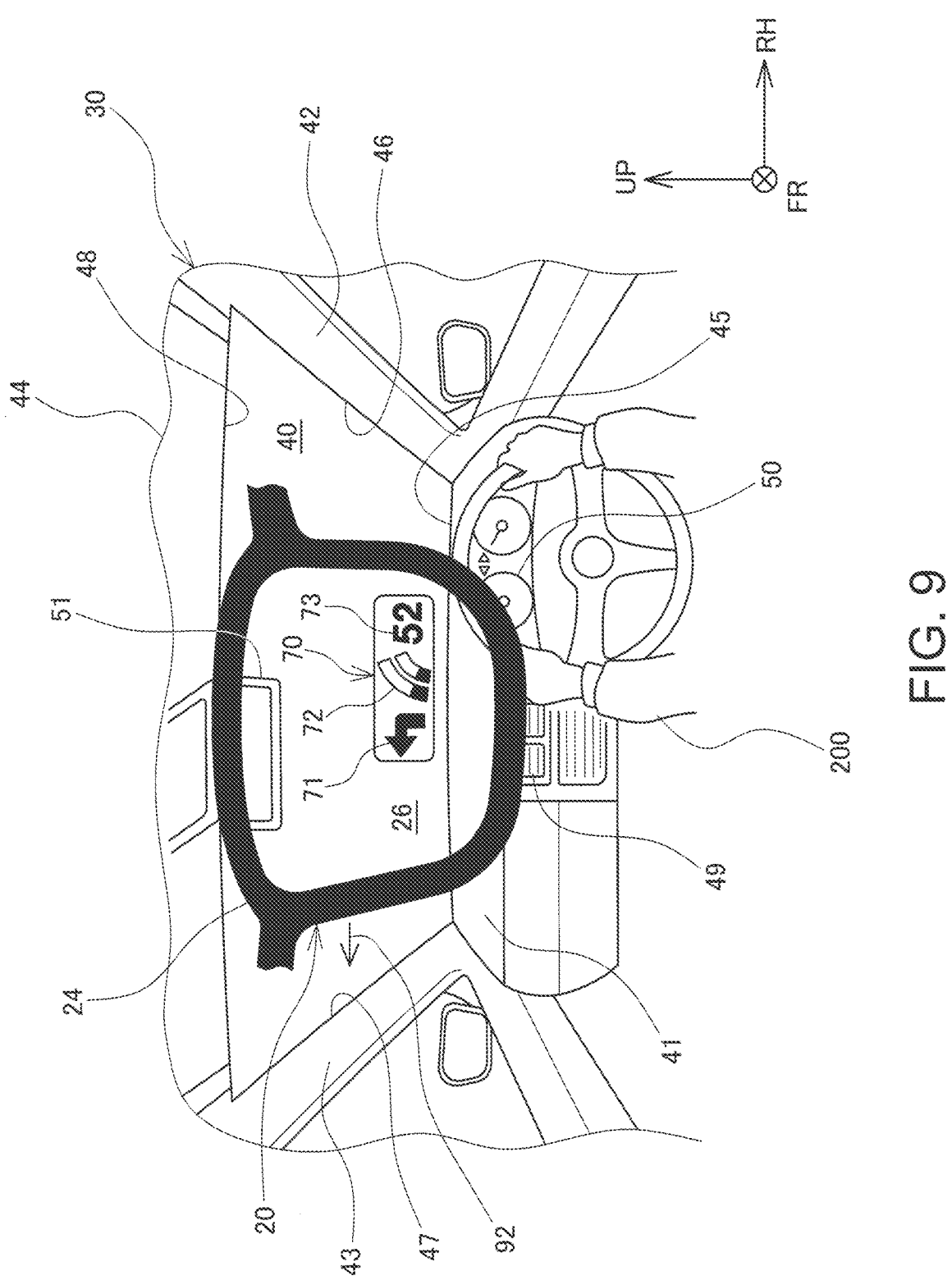
FIG. 9 shows a field of view of the driver wearing the wearable terminal when the driver's face is turned left in a state where the self-location of the wearable terminal is not estimated by the image display controller illustrated in FIG. 1.

An arbitrary position may be previously defined as the fixed position, and the fixed position may be, for example, a position slightly shifted to the right from the center of the display 26 as shown in FIG. 9. In this case, the driver 200 views the image in a region that is slightly shifted to the right from the center of the rim 24. Because the position in this case is fixedly defined on the display 26 irrespective of the self-location which is the relative location of the wearable terminal 20 defined with respect to the features in the vehicle compartment, the content 70 is fixedly displayed on the same position of the wearable terminal 20. Accordingly, during the predetermined time period in which operations to estimate the self-location and determine the display position are not performed, as the driver 200 moves his/her face to the left as indicated by an arrow 92 in FIG. 9, the content 70 is shifted along with the wearable terminal 20 leftward with respect to the demarcation lines 45 and 46 which are the features in the vehicle compartment.

When the predetermined time period has elapsed, the self-location estimation frequency adjusting section 17 determines YES in step S205 of FIG. 7, and outputs a self-location estimation command to the feature extracting section 11. Then, the feature extracting section 11, the self-location estimating section 12, the display position determining section 13, and the image displaying section 14 perform, as in the case of the basic operations previously explained with reference to FIG. 4, the operations to extract the features, estimate the self-location, determine the display position on the display 26, and display the content 70 at the determined display position on the display 26 as indicated in steps S101 to S106 of FIG. 8. The operations in steps S101 to S106 of FIG. 8 are rapidly performed to enable real-time adjustment of the display position of the content 70 to the position that is maintained stationary with respect to the features in the vehicle compartment.

During the operations, the self-location estimated by the self-location estimating section 12 is input into the self-location estimation frequency adjusting section 17, and the display position determined by the display position determining section 13 is stored in the position storing section 18.

The self-location estimation frequency adjusting section 17 determines in step S210 of FIG. 8 whether or not the self-location estimating section 12 successfully completes estimation of the self-location. When the self-location estimating section 12 fails to estimate the self-location and thus no self-location is input from the self-location estimating section 12, or when the estimated self-location is situated, for example, outside the vehicle compartment, the self-location estimation frequency adjusting section 17 determines NO in step S210 of FIG. 8, skips the operation to determine the display position in step S105 of FIG. 8, and jumps to step S211 of FIG. 8. In step S211, the self-location estimation frequency adjusting section 17 retrieves the fixed position previously defined on the display 26 from the position storing section 18, and outputs the retrieved fixed position as the display position to the image displaying section 14. This can prevent displacement of the position of the content 70, upon occurrence of a failure in estimation of the self-location, to an undesirable position which is not intended by the driver 200 wearing the wearable terminal 20.

After displaying the content 70 in step S106 of FIG. 8, the self-location estimation frequency adjusting section 17 returns to step S201 of FIG. 7, and performs the operations in steps S201 to S205 of FIG. 7. Following this, when it is found that the display position is determined during the previously performed operations in steps S101 to S106 of FIG. 8 and is accordingly stored in the position storing section 18, the self-location estimation frequency adjusting section 17 determines YES in step S206 of FIG. 7 and moves to step S207 of FIG. 7 to read out the previously determined display position stored in the position storing section 18 and output the previously determined display position as the display position to the image displaying section 14.

The image displaying section 14 displays the content 70 on the previously determined display position which is input from the self-location estimation frequency adjusting section 17. Because the previously determined display position is the position defined on the display 26 irrespective of a present self-location which is a present relative location of the wearable terminal 20 within the vehicle compartment, the content 70 is displayed on a position fixed to the wearable terminal 20 as in the case of setting the display position to the fixed position having been previously defined on the display 26 as described above. Therefore, as the driver 200 moves his/her face, the content 70 moves together with the wearable terminal 20 relative to the demarcation lines 45 and 46 which are the features in the vehicle compartment.

After the predetermined time period has elapsed, the self-location estimation frequency adjusting section 17 determines YES in step S205 of FIG. 7 and outputs the self-location estimation command to the feature extracting section 11. Then, the feature extracting section 11, the self-location estimating section 12, the display position determining section 13, and the image displaying section 14 perform, as indicated in steps S101 to S106 of FIG. 8, the operations to extract the features, estimate the self-location, determine the display position on the display 26, and display the content 70 at the determined display position on the display 26.

During the operations, because the display position is adjusted based on the estimated self-location, the driver 200 can view the content 70 as if the content 70 is actually fixed to the lower right region of the front glass 40.

As described above, when the wearable terminal 20 is present in the vehicle compartment, the image display controller 10 suspends both estimation of the self-location and determination of the display position to fix the display position to the previously-determined display position of the content 70 during the predetermined time period, and performs, every time the predetermined time period has elapsed, the operations to estimate the self-location and determine the display position for adjusting the display position of the content 70 to the position which is stationary with respect to the demarcation lines 45 and 46 which are the features in the vehicle compartment.

In this way, frequent occurrence of misalignment of the content 70 on the display 26 can be prevented when the wearable terminal 20 is used within the vehicle compartment.

On the other hand, the driver 200 who slightly moves his/her face within the vehicle compartment views the content 70 at a position slightly shifted from the lower right region of the front glass 40 during the predetermined time period in which estimation of the self-location and updating of the display position are suspended. Then, when the estimation of the self-location and the updating of the display position are performed after the predetermined time period, the driver 200 views the content 70 being shifted to a position in the lower right region of the front glass 40. After that, when the driver 200 slightly moves his/her face again, the content 70 appears, for the driver 200, to move to a position slightly shifted from the lower right region of the front glass 40 during the predetermined time period in which the estimation of the self-location and the updating of the display position are suspended, and subsequently move to the lower right region when the predetermined time period has elapsed. In this regard, it appears to the driver 200 that the display position of the content 70 is adjusted to the lower right region of the front glass 40 at an interval of the predetermined time period, so long as the driver 200 does not greatly move his/her face within the vehicle compartment. Accordingly, for the driver 200, the content 70 appears to rest substantially in the lower right region of the front glass 40.

Meanwhile, when NO is determined in step S201 of FIG. 7; i.e., when the actual location of the wearable terminal 20 is not found in the vehicle compartment but is found outside the vehicle compartment, the self-location estimation frequency adjusting section 17 skips operations in step S202 to S209 of FIG. 7, and outputs the self-location estimation command to the feature extracting section 11. In response to the instruction, the feature extracting section 11, the self-location estimating section 12, the display position determining section 13, and the image displaying section 14 rapidly repeat the operations to extract the features, estimate the self-location, determine the display position on the display 26, and display the content 70 at the determined display position on the display 26 as indicated in steps S101 to S106 in FIG. 8. In this way, the display position of the content 70 is adjusted in real time to a position fixed to a feature extracted from objects located outside the vehicle compartment.

When the actual location of the wearable terminal 20 is outside of the vehicle compartment, the image display controller 10 may communicate with a mobile phone, for example, to acquire position information and course information adapted to a walker, and may cause the display 26 of the wearable terminal 20 to display an image including an arrow pointing toward a direction of travel in such a manner that the arrow can be viewed above a sidewalk.

Therefore, when the actual location of the wearable terminal 20 is outside of the vehicle compartment, the self-location estimation frequency adjusting section 17 does not perform the operations that cause a decrease in frequency of estimating the self-location and determining the display position, indicated in steps S202 to S209 of FIG. 7. Conversely, when the actual location of the wearable terminal 20 is in the vehicle compartment, the self-location estimation frequency adjusting section 17 decreases the frequency of estimating the self-location to a frequency lower than that of estimating the self-location when the actual location of the wearable terminal 20 is outside of the vehicle compartment.

As described above, the self-location estimation frequency adjusting section 17 performs, at the interval of the predetermined time period, estimation of the self-location and determination of the display position when the actual location of the wearable terminal 20 is in the vehicle compartment, to thereby decrease the frequency of performing the estimation and determination to the frequency lower than that of continuously performing the estimation and determination when the actual location of the wearable terminal 20 is outside of the vehicle compartment. Because of the decreased frequency of performing the estimation and determination, there can be hindered erroneous detection due to an undesirable change in environment within the vehicle compartment, as a result of which the display position of the content 70 is moved to an unexpected position for the driver 200.

Meanwhile, the driver 200 who is driving the vehicle 30 keeps looking ahead, and therefore rarely moves his/her face. For this reason, the content 70 appears, for the driver 200, to rest substantially in the lower right region of the front glass 40 even though the time interval between operations to determine the display position of the content 70 is extended. From this regard, in a case where it is only determined that the actual location of the wearable terminal 20 is in the vehicle compartment, the self-location estimation frequency adjusting section 17 determines YES in step S202 of FIG. 7 when the driver 200 wearing the wearable terminal 20 is driving the vehicle 30 or when the vehicle 30 is traveling, and sets, in step S204 of FIG. 7, the predetermined time period to the second predetermined length of time longer than the first predetermined length of time to thereby decrease the frequency of performing the estimation of the self-location and the determination of the display position to a frequency lower than that of performing the estimation and the determination. In this way, there is further suppressed movement of the display position of the content 70 to an unexpected position for the driver 200 when the feature is erroneously detected due to an undesirable change in environments within the vehicle compartment.

In addition, prior to determining whether the predetermined time period has elapsed in step S205 of FIG. 7, the self-location estimation frequency adjusting section 17 may analyze the captured image input from the camera 28 of the wearable terminal 20 to determine whether the camera 28 has captured the image during the nighttime or against the sum. In a normal state where the camera 28 has captured the image neither during the nighttime nor against the sun, the self-location estimation frequency adjusting section 17 may skip the operations in steps S205 to S209 shown in FIG. 7 and may cause the feature extracting section 11, the self-location estimating section 12, the display position determining section 13, and the image displaying section 14 to rapidly repeat the operations in steps S101 to S106 shown in FIG. 8 for extracting the feature, estimating the self-location, determining the display position on the display 26, and displaying the content 70 at the determined display position on the display 26.

In this way, the content 70 is adjusted in real time to the position which is stationary with respect to the feature of the vehicle compartment when the camera 28 has captured the image neither during the nighttime nor against the sun, and thus a possibility of erroneously detecting the feature is low. Then, the frequency of estimating the self-location and determining the display position may be decreased only when the camera 28 has captured the image during the nighttime or against the sun, and thus the possibility of erroneously detecting the feature is high. In this way, it can be further prevented that the display position of the content 70 is moved to an unexpected position for the driver 200 due to erroneous detection of the feature when the camera 28 captures the image during the nighttime or against the sun.

The image display controller 10 which is attached to the wearable terminal 20 in the above description is not limited to such arrangement and may be mounted on the vehicle 30.

Further, the operations of the image display controller 10 explained with reference to FIGS. 4, 7, and 8 may also constitute an image display controlling method for displaying an image on the display 26 of the wearable terminal 20.

The invention claimed is:

1. An image display controller for displaying an image on a display of a wearable terminal, wherein the image display controller is configured to:

periodically estimate a self-location of the wearable terminal, determine a display position of the image on the display based on the estimated self-location, and display the image at the determined display position; and detect whether an actual location of the wearable terminal is located within a vehicle compartment, and, when the actual location of the wearable terminal is detected to be located within the vehicle compartment, decrease a frequency of estimating the self-location below the frequency at which the self-location is estimated when the wearable terminal is detected to be located outside the vehicle compartment.

2. The image display controller according to claim 1, wherein the image display controller is further configured to suspend subsequent estimation of the self-location and a change of the display position during a predetermined time period after the self-location is estimated when the actual location is detected to be located within the vehicle compartment.

3. The image display controller according to claim 2, wherein the image display controller is further configured to display the image at a fixed position, which has been previously defined on the display, until the self-location is initially estimated when the actual location is detected to be located within the vehicle compartment, or until subsequent estimation of the self-location is completed after a failure in estimation of the self-location when the actual location is detected to be located within the vehicle compartment.

4. The image display controller according to claim 3, wherein the image display controller is further configured to:
estimate the self-location of the wearable terminal based on an image captured by an image pickup device installed in the wearable terminal; and
communicate with a vehicle to detect whether the actual location of the wearable terminal is located within the vehicle compartment.

5. The image display controller according to claim 2, wherein the image display controller is further configured to:
estimate the self-location of the wearable terminal based on an image captured by an image pickup device installed in the wearable terminal; and
communicate with a vehicle to detect whether the actual location of the wearable terminal is located within the vehicle compartment.

6. The image display controller according to claim 1, wherein the image display controller is further configured to display the image at a fixed position, which has been previously defined on the display,
until the self-location is initially estimated when the actual location is detected to be located within the vehicle compartment, or
until subsequent estimation of the self-location is completed after a failure in estimation of the self-location when the actual location is detected to be located within the vehicle compartment.

7. The image display controller according to claim 6, wherein the image display controller is further configured to:
estimate the self-location of the wearable terminal based on an image captured by an image pickup device installed in the wearable terminal; and
communicate with a vehicle to detect whether the actual location of the wearable terminal is located within the vehicle compartment.

8. The image display controller according to claim 1, wherein the image display controller is further configured to:
estimate the self-location of the wearable terminal based on an image captured by an image pickup device installed in the wearable terminal; and
communicate with a vehicle to detect whether the actual location of the wearable terminal is located within the vehicle compartment.

9. The image display controller according to claim 8, wherein the image display controller is further configured to:
communicate with the vehicle to detect whether the vehicle is traveling or a wearer of the wearable terminal is driving, and
when it is detected that the vehicle is traveling or the wearer is driving, along with the actual location being detected to be located within the vehicle compartment, decrease the frequency of estimating the self-location below the frequency of estimating the self-location when it is solely detected that the actual location is located within the vehicle compartment.

10. The image display controller according to claim 8, wherein the image display controller is further configured to decrease the frequency of estimating the self-location when the image pickup device captures the image during the nighttime or against the sun.

11. An image display controlling method for displaying an image on a display of a wearable terminal, the method comprising:

periodically estimating a self-location of the wearable terminal, determining a display position of an image on the display based on the estimated self-location, and displaying the image at the determined display position; and detecting whether an actual location of the wearable terminal is located within a vehicle compartment, and when the actual location of the wearable terminal is detected to be located within the vehicle compartment, decreasing a frequency of estimating the self-location below the frequency at which the self-location is estimated when the wearable terminal is detected to be located outside the vehicle compartment.

12. The image display controlling method according to claim 11, further comprising:

suspending subsequent estimation of the self-location and a change of the display position during a predetermined time period after the self-location is estimated when the actual location is detected to be located within the vehicle compartment.

13. The image display controlling method according to claim 11, further comprising:

displaying the image at a fixed position, which is previously defined on the display,
until the self-location is initially estimated when the actual location is detected to be located within the vehicle compartment, or
until subsequent estimation of the self-location is completed after a failure in estimation of the self-location when the actual location is detected to be located within the vehicle compartment.

14. The image display controlling method according to claim 11, further comprising:

estimating the self-location of the wearable terminal based on an image captured by an image pickup device installed in the wearable terminal; and
communicating with a vehicle to detect whether the actual location of the wearable terminal is located within the vehicle compartment.

15. The image display controlling method according to claim 14, further comprising:

communicating with the vehicle to detect whether the vehicle is traveling or a wearer of the wearable terminal is driving; and
when it is detected that the vehicle is traveling or the wearer is driving, along with the actual location being detected to be located within the vehicle compartment, decreasing the frequency of estimating the self-location below the frequency of estimating the self-location when it is solely detected that the actual location is located within the vehicle compartment.

16. The image display controlling method according to claim 14, further comprising:

decreasing the frequency of estimating the self-location when the image pickup device captures the image during the nighttime or against the sun.

17. An image displaying system, comprising:

a wearable terminal comprising an image pickup device and a display; and a controller, wherein the controller is configured to periodically estimate a self-location of the wearable terminal based on an image captured by the image pickup device in the wearable terminal, determines a display position of the image on the display based on the estimated self-location, and display the image at the determined display position; and communicate with a vehicle to detect whether an actual location of the wearable terminal is located within a vehicle compartment, and when the actual location of the wearable terminal is detected to be located within the vehicle compartment, decrease a frequency of estimating the self-location below the frequency at which the self-location is estimated when the wearable terminal is detected to be located outside the vehicle compartment.

18. The image displaying system according to claim 17, wherein:

the controller is further configured to suspend subsequent estimation of the self-location and a change of the display position during a predetermined time period after the self-location is estimated when the actual location is detected to be located within the vehicle compartment.

\* \* \* \* \*